United States Patent
Le chevalier

(10) Patent No.: US 11,030,620 B1
(45) Date of Patent: Jun. 8, 2021

(54) CASH RECONCILIATION BOTS SYSTEMS

(71) Applicant: Wells Fargo Bank, N.A., San Francisco, CA (US)

(72) Inventor: Vincent Le chevalier, San Jose, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 431 days.

(21) Appl. No.: 15/666,354

(22) Filed: Aug. 1, 2017

(51) Int. Cl.
*G06Q 20/40* (2012.01)
*G06Q 20/34* (2012.01)
*G06F 16/903* (2019.01)

(52) U.S. Cl.
CPC ......... *G06Q 20/401* (2013.01); *G06F 16/903* (2019.01); *G06Q 20/34* (2013.01)

(58) Field of Classification Search
CPC .... G06Q 20/40; G06Q 30/06; G06Q 20/3674; G06Q 20/405; G06Q 20/12; G06Q 20/322; G06Q 20/4014; G06Q 30/0222; G06Q 20/18; G06Q 30/04; G06Q 20/06; G06Q 20/108; G06Q 30/00; G06Q 40/025; G06Q 20/22; G06Q 20/401; G06Q 20/34; G06F 16/903
See application file for complete search history.

(56) References Cited

U.S. PATENT DOCUMENTS

| | | | | |
|---|---|---|---|---|
| 2003/0195843 | A1* | 10/2003 | Matsuda | G06Q 20/04 705/39 |
| 2004/0205772 | A1* | 10/2004 | Uszok | H04L 29/06 719/317 |
| 2006/0122917 | A1* | 6/2006 | Lokuge | G06F 16/95 705/27.1 |
| 2007/0124270 | A1* | 5/2007 | Page | G10L 19/04 |
| 2016/0125460 | A1* | 5/2016 | Zellner | G06Q 30/0255 705/14.53 |
| 2017/0288943 | A1* | 10/2017 | Plumb | H04L 41/046 |

(Continued)

OTHER PUBLICATIONS

"Mastercard, Merchants Launch Masterpass-Enabled Bots" PayTech. FinTech Futures (https://www.fintechfutures.com/author/bankingtechnology/), Apr. 20, 2017 (Year: 2017).*

(Continued)

*Primary Examiner* — Elda G Milef
(74) *Attorney, Agent, or Firm* — Shumaker & Sieffert, P.A.

(57) ABSTRACT

Techniques are described for executing a bot platform configured to track real-time status of payment transactions for a business. The techniques enable reconciliation of a specific transaction to its actual payment status on the business's designated bank account. The bot platform may be executed on one or more computing devices associated with the business or a third-party. In some examples, an order bot is instantiated on the bot platform for a specific transaction and communicates with other bots on the bot platform that track the status of the specific transaction through each of the constituent parts of the payment process (i.e., authentication, capture, settlement, and disbursement). These other bots may communicate with one or more credit card processors and/or one or more credit card companies to determine the status of the specific transaction. The order bot may capture and log this information and provide status updates to the business.

20 Claims, 5 Drawing Sheets

(56) References Cited

U.S. PATENT DOCUMENTS

2017/0366478 A1* 12/2017 Mohammed ............ H04L 51/02
2018/0005288 A1* 1/2018 Delaney ............. G06Q 30/0613

OTHER PUBLICATIONS

"Masterpass-Enabled Bots Launch a Messenger with FreshDirect, Subway, and The Cheesecake Factory." Press Release, Engagement Bureau, https://newsroom.mastercard.com/press-releases/masterpass-enabled-bots-launch-on-messenger-with-freshdirect-subway-and-the—(Year: 2017).*

Johnson, Khari. "Mastercard to Launch Personal Finance Botand Commerce API for Payments." Oct. 25, 2016. https://venturebeat.com/2016/10/25/mastercard-to-launch-personal-finance-bot-and-commerce-api-for-payments/ (Year: 2016).*

"What is Instantiate?—Definition from Techopedia." Techopedia.com. https://www.techopedia.com/definition/26857/instantiate. (Oct. 13, 2014) (Year: 2014).*

Mitroff, Sarah. "What is a bot? Here's everything you need to know." CNET.com May 5, 2016. (Year: 2016).*

\* cited by examiner

CASH RECONCILIATION BOTS SYSTEMS

TECHNICAL FIELD

The disclosure relates to computing devices executing software applications.

BACKGROUND

Credit cards have long provided card holders with a convenient payment option at a majority of merchants. For many corporations, online eCommerce transactions represent an increasingly large percentage of their overall financial transactions. When a credit card transaction occurs, a number of different parties are involved, e.g., a customer or buyer, a merchant or business, a payment gateway, a credit card payment processor, and a credit card company. For example, a merchant's eCommerce system may interface with one or more payment gateways, which may each have a relationship with a credit card processor. Credit card processors may each have a relationship with one or more credit card companies or networks, e.g., Visa, Mastercard, American Express, or the like. Each of these credit card companies' networks may maintain one or more customer accounts for one or more customers.

A credit card transaction includes a number of stages prior to the funds being disbursed to, for example, a merchant's bank. For example, during the transaction, the credit card processors are responsible for authenticating a customer's account, capturing or blocking the funds for the transaction on the customer's account, settling the transaction by taking the funds from the associated credit card company, and disbursing the funds to the merchant's bank. The disbursement itself is typically not completed on a per transaction basis, but instead may be completed in a block of transaction on a daily, weekly, or monthly basis. Furthermore, some transactions may be involved in a chargeback in which a prior transaction is reversed or refunded. Additionally, fees may be charged by one or more of the entities involved in processing the transaction.

SUMMARY

In general, this disclosure describes techniques for executing a bot platform configured to track real-time status of payment transactions for a business. The techniques enable reconciliation of a specific transaction to its actual payment status on the business's designated bank account. These techniques may allow for a simplified reconciliation process and may allow a business to determine when a disbursement will occur for a given transaction. The bot platform may be executed on one or more computing devices associated with the business or a third-party. In some examples, an order bot is instantiated on the bot platform for a specific transaction and communicates with other bots on the bot platform that track the status of the specific transaction through each of the constituent parts of the payment process (i.e., authentication, capture, settlement, and disbursement). These other bots may communicate with one or more credit card processors and/or one or more credit card companies to determine the status of the specific transaction. The order bot may capture and log this information and provide status updates to the business.

In an example, a computing device comprising: a memory and one or more processors in communication with the memory and configured to: receive, from a credit transaction system, an indication of a transaction performed via the credit transaction system; in response to receiving the transaction indication, instantiate an order bot for the transaction, the order bot configured to: request status information associated with the transaction from one or more bots executed on the computing device and configured to query the status information associated with the transaction from a credit card processor used by the credit transaction system; receive the requested status information associated with the transaction; and store the received status information in a log associated with the transaction.

In another example, a method comprising: receiving, from a credit transaction system by a computing device, an indication of a transaction performed via the credit transaction system; in response to receiving the transaction indication, instantiating, by the computing device, an order bot for the transaction; requesting, by the order bot on the computing device, status information associated with the transaction from one or more bots executed on the computing device and configured to query the status information associated with the transaction from a credit card processor used by the credit transaction system; receiving, by the order bot on the computing device, the requested status information associated with the transaction; and storing, by the order bot on the computing device, the received status information in a log associated with the transaction.

In another example, a non-transitory computer-readable medium having instructions stored thereon that, upon execution, cause one or more processors to: receive an indication of a transaction performed via a credit transaction system; in response to receiving the transaction indication, instantiate an order bot for the transaction; request status information associated with the transaction from one or more bots configured to query the status information associated with the transaction from a credit card processor used by the credit transaction system; receive the requested status information associated with the transaction; and store the received status information in a log associated with the transaction.

The details of one or more examples of the disclosure are set forth in the accompanying drawings and the description below. Other features, objects, and advantages of the disclosure will be apparent from the description and drawings, and from the claims.

DETAILED DESCRIPTION

For some businesses, online eCommerce transactions represent an increasingly large percentage of their overall financial transactions. But as the volume of transactions increase year over year, the process of reconciling these transactions from cash in transit and/or disbursed may be increasingly complex due to the number of parties involved as well as the differences between parties. Furthermore, companies may audit sales and credit card records quarterly which may require reconciling of transactions and credit card disbursements. Because of the complexity, companies may not know how much money will be disbursed to their bank accounts the next day or week, or to which orders or transactions the disbursements are associated. As a result, dedicated software engineering resources are typically required to reconcile transactions from cash in transit and/or disbursed. Techniques of the present disclosure relate to a cash reconciliation bots system that comprises a bot platform executed on one or more computing devices associated with a business or a third-party that tracks the real-time status of each order or transaction across the various systems in order to reconcile a specific order to its actual payment status on the designated corporate bank account. These techniques may allow for a simplified reconciliation process and may allow a business to determine when a disbursal will occur for a given order ahead of time.

Figure 1:
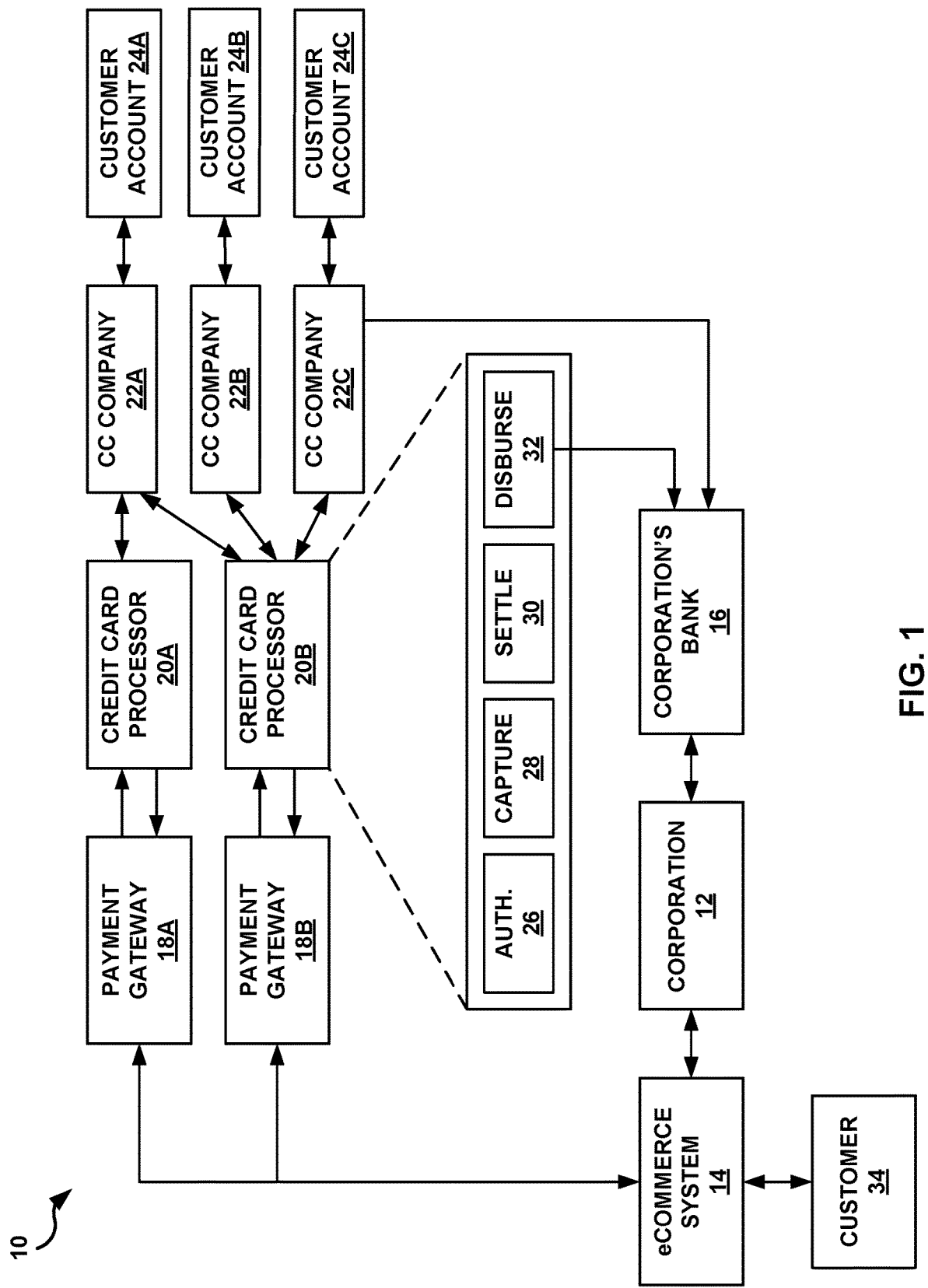
FIG. 1 is a block diagram illustrating an example network system.

FIG. 1 is a block diagram illustrating an example network system 10 in accordance with the techniques of this disclosure. Network system 10 may include one or more networks. The networks may include public networks like the Internet and private networks including service provider networks or a combination of public and private networks. Corporation 12, eCommerce system 14, corporation's bank, payment gateway 18, credit card processor 20, and credit card (CC) company 22 may each include as a single computer, one or more server computers or other similar arrangement and/or network devices (e.g., switches, routers). As illustrated in FIG. 1, network system 10 includes corporation 12 in communication with an eCommerce platform 14, where corporation 12 may sell several products online. Ecommerce platform 14 Corporation 12 and/or eCommerce platform 14 may maintain a merchant account that enables corporation 12 to accept credit or debit cards as payment from customers (e.g., customer 34) for goods or services provided. Corporation 12 may include any entity or individual that can accept credit cards including any merchant, business, business entity, non-profit entity, sole proprietorship, partnership, limited liability company, or corporate entity. While the present example uses eCommerce platform 14, techniques of this disclosure are not so limited. Any type of credit card transaction (e.g., eCommerce, virtual terminal, at a point of sale (POS) device, whether the credit card is swiped/inserted, or whether the account numbers entered manually or scanned, may use techniques of the present disclosure.

Customer 34 may be in communication with eCommerce platform 14. Customer 34 may be a computing device associated with a cardholder of a debit or credit card from an issuing bank. For example, customer 34 may be any of a wide range of devices, including a laptop or desktop computer, tablet computer, so-called "smart" phone, "smart" pad, "smart" watch, an Internet of Things (IoT) device, or other personal digital appliance equipped for wired or wireless communication that is capable of interfacing with eCommerce system 14. Customer 34 may present the credit or debit card to a merchant (e.g., corporation 12 and/or eCommerce platform 14) as payment for goods and services. In one example, customer 34 may be purchasing goods online via a computing device. In another example, customer 34 may interact with a point of sale (POS) device at a merchant, which would take the place of the eCommerce system.

When customer 34 completes a transaction or performs a checkout process, eCommerce platform 14 may generate an order number. Ecommerce platform 14 may be configured to generate a large number of distinct order numbers. Ecommerce platform 14 for the corporation 12 is also in communication with bank 16 of corporation 12. Corporation 12 may have one or more accounts at bank 16.

Ecommerce platform 14 is in communication with payment gateways 18A and 18B (collectively "payment gateways 18"). Payment gateways 18 are in communication with one or more credit card processors 20A and 20B. Payment gateways 18 may include a portal that route transactions to credit card processors 20. In other examples, eCommerce platform 14 may be in communication with more than two payment gateways, each of which is associated with a different credit card processor.

Each of credit card processors 20 (e.g., Braintree®, Authorize.Net®, and Worldpay®) are in communication with a number of credit cards companies 22A, 22B, and 22C (collectively "CC companies 22"). Credit card companies 22 may include Visa®, Mastercard®, and American Express®. Credit card companies are in communication with customer accounts 24A, 24B, and 24C (collectively "customer accounts 24"). Customer accounts 24 may include an account associated with a bank issuing credit cards to customers (e.g. customer 34). The issuing bank may be a member of a credit card association (e.g., credit card 22) and use a credit card network.

Credit card processors 20 may each perform the tasks of authentication 26, capture 28, settlement 30, and disbursement 32 to process credit card payment transactions. Authentication task 26 includes verification that customer 34 has funds (e.g., money/currency or available credit) available for a particular transaction or order in its associated one of customer accounts 24. Credit card processors 20 may authenticate transactions from one or more payment gateways 18. Capture task 28 includes blocking the funds on the one customer accounts 24 such that the funds are secured for the particular transaction or order. Settlement task 30 includes removal of the funds from the one of customer accounts 24 and transferring the funds to a temporary account. Disbursement task 32 includes sending the funds from the temporary account to bank 16 of corporation 12. For some of CC companies 22, e.g., CC companies 22A and 22B, the temporary account may be held by credit card processors 20 such that credit card processors 20 handle distribution of the funds to the corporation's bank 16. For other CC companies 22, e.g., CC company 22C, the temporary account may be held by CC company 22C such that CC company 22C handles distribution of the funds to the corporation's bank 16 directly.

As illustrated, disbursement task 32 is in communication with bank 16 of corporation 12 to disburse the settled funds from the customer's credit card transaction. Disbursement task 32 may direct aggregated disbursement of funds from credit card processors 20 minus fees and charge backs to bank 16 of corporation 12. Credit card 22C may also direct aggregated disbursement of funds minus fees and charge backs to bank 16 of corporation 12. Aggregated disbursements may occur daily, hourly, or monthly and may be based on the volume of orders.

In some examples, disbursement 32 of funds is performed as a block (e.g., multiple orders and/or transactions aggregated in a single disbursement) and not per order (e.g., separate single disbursements for each order). Because disbursement may take time and because payment processors (credit card companies 22, credit card processors 20, payment gateways 18) may apply different fees and process. For example, credit card company 22C (e.g., American Express®) sends funds directly to a bank account at bank 16 for corporation 12 while other credit card companies 22A and 22B (e.g., VISA® and Mastercard®) go through one or more payment processors (e.g., credit card processors 20A and 20B) for disbursement to the bank account at bank 16 for corporation 12.

Furthermore, disputed charges may result in a charge back. All of the foregoing factors may make reconciliation of orders difficult and typically requires custom software engineering work. Reconciliation may include determining the status of an individual order including, for example, determining: whether the order has been disbursed, whether the transaction was charged back, whether the transaction is still pending disbursement, and what fees are paid for a particular transaction.

Figure 2:
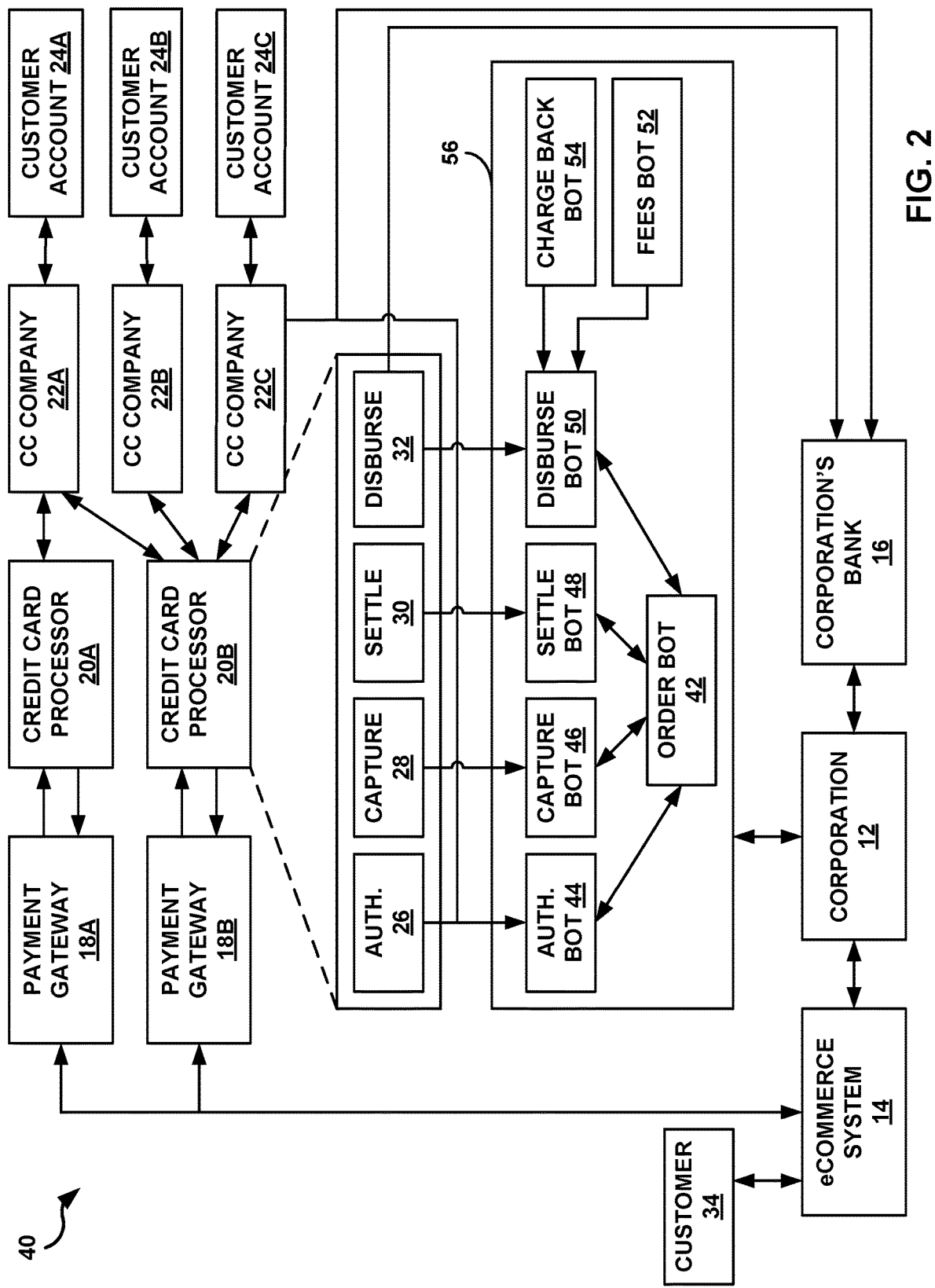
FIG. 2 is a block diagram illustrating an example network system in accordance with the techniques of this disclosure.

FIG. 2 is a block diagram illustrating an example network system 40 in accordance with the techniques of this disclosure. Network system 40 augments system 10 of FIG. 1 by adding bot platform 56. In network system 40, each order placed on ecommerce platform 14 is associated with one or more bots, in bot platform 56, such as, order bot 42. Corporation 12, eCommerce system 14, corporation's bank, payment gateway 18, credit card processor 20, credit card (CC) company 22, and bot platform 56 may each include as a single computer, one or more server computers or other similar arrangement and/or network devices (e.g., switches, routers). Each of the devices of network system 40 may be connected by one or more networks. The networks may include public networks like the Internet and private networks including service provider networks or a combination of public and private networks.

Order bot 42 may query other bots such as authenticate bot 44, capture bot 46, settle bot 48, disburse bot 50, fees bot 52, and chargeback bot 54 which may be configured to access or retrieve information from a specific credit card processor 20 or credit card company 22. Order bot 42 may select between multiple authenticate bots 44, capture bots 46, settle bots 48, disburse bots 50, fees bots 52, and chargeback bots 54 based on the credit card processor 20 or credit card company 22 used for the order.

Order bot 42 is created by eCommerce system 14. When a transaction is submitted (e.g., customer 34 submits an order for processing), an order number is associated with a transaction between customer 34 and eCommerce system 14. The order number may be assigned by eCommerce system 14, payment gateway 18, credit card processor 20, or credit card company 22. That order number is assigned to a new order bot 42 created by, for example, eCommerce system 14, to track the progress of an order through the stages of the credit card system (tasks such as authentication 26, capture 28, settlement 30, and disbursal 32). Once order bot 42 is created, the task of order bot 42 is to track the status of the different phases of the process of the credit card transaction, for each credit card processor 20, by interfacing directly to bots 44, 46, 48, 50, 52, and 54 executed on bot platform 56 that track the tasks of authentication 26, capture 28, settlement 30, and disbursement performed by a given one of credit card processors 20. Authenticate bot 44, capture bot 46, settlement bot 48, disbursement bot 50, fees bot 52, and charge back bot 54 may each be in communication with one or more order bots 42. There also may be a distinct set of authenticate bots 44, capture bots 46, settlement bots 48, disbursement bots 50, fees bot 52, and charge back bots 54 for each distinct credit card processor 20 or information possessing entity (e.g., credit card company 22C). Bots executed on bot platform 56 may connect to tasks performed by the given one of credit card processors 20 through a secure application programming interface (API) or other connection to query, capture, and log information regarding a particular transaction on behalf of an order bot 42. A business to business (B2B) back-end connection secured by a time-limited access token may be used as a credential needed to call the secure API. Order bot 42 may query these other bots in bot platform 56 (e.g., authenticate bot 44, capture bot 46, settle bot 48, disburse bot 50, fees bot 52, and chargeback bot 54) to determine status information for the particular transaction assigned to the order bot 42.

According to the disclosed techniques, each disbursement from the one of credit card processors 20, or credit card company 22C (e.g., in the case of American Express®), may be reconciled by querying, by eCommerce system 14, each order's bot (e.g., order bot 42) which tracks each step of the payment process across all actors.

Authenticate bot 44 may be configured to query authentication information at a one or more credit card processor 20 or credit card company 22. Authenticate bot 44 may be configured to retrieve and store information regarding the authentication status of one or more orders tracked by bot platform 56. Card authentication includes a determination as to whether the credit card information of customer 34 is valid (e.g., credit card account number, card type, card security code and/or cardholder billing address) and whether customer 34 has sufficient funds (e.g., funds in an account or a credit limit) to complete the transaction. The status of card authentication can indicate that the credit card account of customer 34 has been authenticated, that authentication is pending, a referral is requested, or that authentication failed. In some examples, authentication happens quickly. In other examples, e.g., where a referral is made, authentication takes more time. A referral is a request for additional information (either from the merchant corporation 12 or customer 34) before an authorization can be issued. For example, if customer 34 makes a purchase in a foreign country, is using the credit card more than usual in a short amount of time, or has reached the credit limit a referral may be requested by credit card processor 20. Authenticate bot 44 may respond to queries from order bot 42 with the authentication status of a particular order.

Capture bot 46 may be configured to query capture status information from payment processor 20. A capture order may include an instruction from the merchant (e.g., corporation 12 or eCommerce platform 14) to customer account 24 to deduct the funds from the customer account 24. Capture task 28 may include blocking or holding funds at a bank of customer 34. A captured status indicates that the funds have been captured by payment processor 20. Capture task 28 may occur at the same time as or immediately following authentication 26. In other examples, however, the period for capture 28 may be delayed in order to ship goods purchased by corporation 12 or to determine the creditworthiness of customer 34. The status retrieved from capture task 28 may be "captured" if capture task 28 is complete, "pending" if capture task 28 is in progress, or "failed" if capture task 28 is aborted or failed to complete. Order bot 42 may store capture status results for the assigned transaction in a log. In another example, capture bot 46 may store capture status query results. Capture bot 46 may respond to queries from order bot 42 with a capture status of a particular order.

Settlement bot 48 may be configured to query settlement information from credit card processor 20. Settlement 30 includes transferring funds from customer's bank 24 to payment processor 20 and the transaction is posted to the account 24 of customer 34. The settlement status retrieved from settlement task 30 may be "completed" where settlement has completed, "pending" where settlement is in progress, and "failed" where settlement is aborted or failed to complete. Order bot 42 may store settlement status results for the assigned transaction in a log. In another example, settlement bot 48 may store settlement status query results. Settlement bot 48 may respond to queries from order bot 42 with the settlement status of a particular order.

Disburse bot 50 may be configured to query disbursement information from credit card processor 20 as well as query information from charge back bot 54 and fees bot 52. Disbursement includes a transfer of the net proceeds (e.g., transaction amount minus fees and charge backs) from transactions into bank 16 (i.e., the bank of corporation 12). In addition, disbursement information (e.g., a disbursement report) may include information about the disbursement amount and associated details. Additionally, disburse bot 50 may obtain status information from credit card processor 20. Status information may include the status of a disbursement, e.g., disbursement cleared, disbursement pending, disbursement aborted. Disburse bot 50 may store disbursement amount and associated details and status information received from credit card processor 20 as well as chargeback data received from charge back bot 54 and fees data from fees bot 52. Disburse bot 50 may respond to queries from order bot 42 with disbursement amount and associated details and status information.

Fees bot 52 may be configured to query fee information from credit card processor 20 and/or disburse bot 50. Fees may include the amount that a merchant (e.g., corporation 12) pays per transaction for processing (e.g., interchange fees, chargeback fees, assessments, etc. Fees may be credit card processor specific (e.g., different fees for credit card processor 20A and 20B), credit card company specific (e.g., different fees or credit card companies 22A, 22B and 22C) and/or volume based (e.g., a lower fee for a greater amount of credit card revenue). Fees bot 52 may calculate and store the fees charged for a particular order. Fees bot 52 may, based on a query by disburse bot 50 or order bot 42, return the fee amount (that reduced the disbursement).

Chargeback bot 54 may be configured to query chargeback information from credit card processor 20 and/or disburse bot 50. Chargebacks may include a reversal of a credit card transaction. In some example, chargebacks are initiated by the transaction card issuer (e.g. credit card 22) at the cardholder's request (e.g., customer 34). Chargebacks may occur due to, for example: customer disputes, potential or actual fraud (on the part of merchants, sales associates and/or customers), processing errors and authorization issues. Chargeback bot 54 may calculate a chargeback fee. Chargeback bot 54 may calculate a chargeback period, e.g., the number of calendar days during which the credit card 22 has the right to charge the transaction back. Chargeback bot 54 may determine a reason code that identifies the reason for a chargeback. Chargeback bot 54 may respond to queries from fee bot 52, disburse bot 50, and/or order bot 42 to provide a chargeback fee, a remaining chargeback period, and/or a reason code.

When an order is placed by customer 34 on eCommerce platform 14, eCommerce platform may instantiate a new order bot 42 associated with the placed order. For example, order bot 42 may comprise a virtual machine or virtual software instance executed on bot platform 56 provided by one or more computing devices. The one or more computing device may be associated with corporation 12 or with a third-party that provides the cash reconciliation system to corporation 12. Order bot 42 may be configured to receive order information from eCommerce platform 14. Order information may include an order number, payment gateway 18 and/or credit card processor 20 details. eCommerce platform 14 may provide order information concurrent with or immediately after an order is placed by customer 34. Order bot 42 may be configured to query each of the other bots in the bot platform (e.g., authenticate bot 44, capture bot 46, settle bot 48, disburse bot 50, fees bot 52, and chargeback bot 54) to determine the status of the particular order assigned to order bot 42.

In some examples, order bot 42 may query each of the bots periodically (e.g., regardless of the current status of the order). In other examples, order bot may be configured to query authenticate bot 44 and continue to query authenticate bot 44 until the order has completed authentication (e.g., the order has been authenticated or was denied). When the returned status is that the order has been authenticated, order bot 44 may query capture bot 46 to determine the capture status. When capture has been completed successfully, order bot 42 may be configured to determine the settlement status by querying settle bot 48. When settlement has been completed successfully, order bot 42 may be configured to determine the disbursement status by querying disburse bot 50. Order bot 42 may finish querying a bot when the status is no longer pending. In some examples, order bot 42 may query disburse bot 50 even after disbursement of an order to determine whether there was a chargeback following disbursement. Order bot 42 may be removed or torn down from bot platform 56 once the chargeback period has completed or after a period of time following an error in the order (e.g., an error may be encountered where one or more steps of the order process fail to positively complete). In this way, bot platform 56 does not need to maintain an order bot for each order or transaction with eCommerce system 14, but instead only maintains order bots for active orders or transactions, including those that may still be subject to a charge back (e.g., within a 30-day money back guarantee period).

Each bot in the bot platform 56 may include an application that is executed and run. In some examples bots are run continuously. In other examples, bots are run automatically monthly, weekly, daily (e.g., at the beginning of a business day or after normal business hours), each half day, hourly, or at some different time interval. In some examples, bots also may be run at different intervals depending on the type of bot, the importance of the order tracked, how many bots are currently active, and/or whether a query was sent to the bot.

Corporation 12 may query bot platform 56 and/or order bot 42 for other current status information about one or more pending transactions.

In addition, because the process of disbursement typically involves a money transfer from one bank to another, corporation 12 can be aware of upcoming disbursement, cash in transit, before actually receiving them, which may improve cash flow prediction.

Because other factors such as fees and charge back have a direct impact on the amount of each disbursement, corporation 12 may receive an accurate reconciliation for each incoming disbursement by querying the order bot 42.

Figure 3:
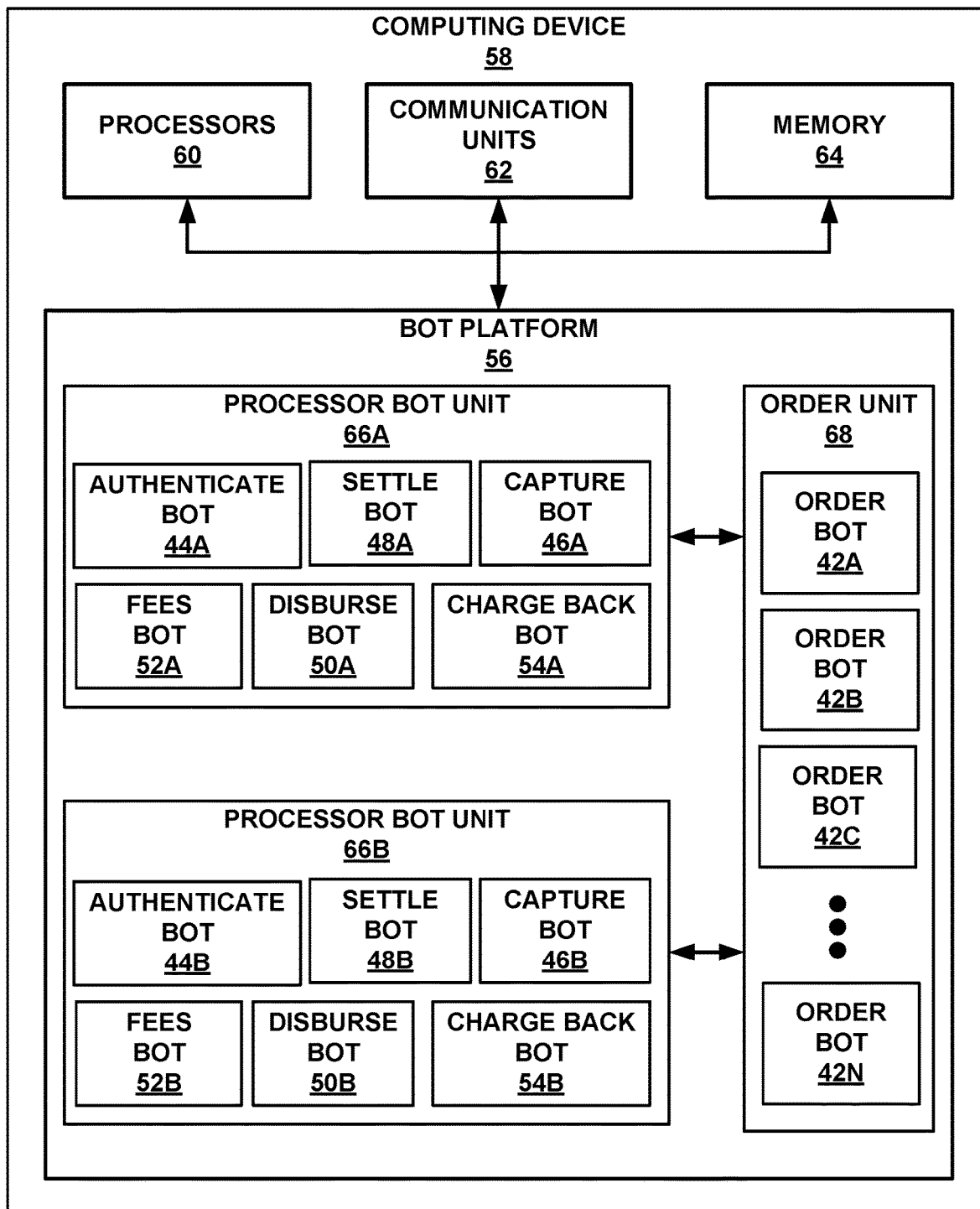
FIG. 3 is a block diagram illustrating an example computing device configured to execute a bot platform, in accordance with the techniques of this disclosure.

FIG. 3 is a block diagram illustrating an example computing device 58 configured to run bot platform 56, in accordance with the techniques of this disclosure. As shown in the example of FIG. 3, computing device 58 includes one or more processors 60, one or more communication units 62, and one or more memory units 64. Computing device 58 also includes an operating system (not shown) executed on processors 60 and configured to provide bot platform 56 on which to execute one or more bots or software instances. In the example of FIG. 3, bot platform 56 includes processor bot units 66A and 66B and order unit 68. Each of the components, units or modules of computing device 58 are coupled (physically, communicatively, and/or operatively) using communication channels for inter-component communications. In some examples, the communication channels may include a system bus, a network connection, an inter-process communication data structure, or any other method for communicating data.

Processors 60, in one example, may comprise one or more processors that are configured to implement functionality and/or process instructions for execution within computing device 58. For example, processors 60 may be capable of processing instructions stored by memory 64. Processors 60 may include, for example, microprocessors, digital signal processors (DSPs), application specific integrated circuits (ASICs), field-programmable gate array (FPGAs), or equivalent discrete or integrated logic circuitry, or a combination of any of the foregoing devices or circuitry.

Memory 64 may be configured to store information within computing device 58 during operation. Memory 64 may include a computer-readable storage medium or computer-readable storage device. In some examples, memory 64 include one or more of a short-term memory or a long-term memory. Memory 64 may include, for example, random access memories (RAM), dynamic random access memories (DRAM), static random access memories (SRAM), magnetic discs, optical discs, flash memories, or forms of electrically programmable memories (EPROM) or electrically erasable and programmable memories (EEPROM). In some examples, memory 64 is used to store program instructions for execution by processors 30. Memory 64 may be used by software or applications running on computing device 58 (e.g., bot platform 56) to temporarily store information during program execution. In further examples, memory 64 is used to store data associated with software or applications running on computing device 64 in a permanent or semi-permanent manner.

Computing device 58 may utilize communication units 62 to communicate with external devices via one or more devices or networks, e.g., corporation 12, eCommerce platform 14, credit card processors 20, and credit card companies 22 from FIG. 2. Communication units 62 may be network interfaces, such as Ethernet interfaces, optical transceivers, radio frequency (RF) transceivers, or any other type of devices that can send and receive information. Other examples of interfaces may include Wi-Fi, near-field communication (NFC), radio-frequency identification (RFID), or Bluetooth® radios.

In some examples, communication units 62 may connect to one or more networks to communicate with, for example, one or more credit card processors 20, one or more credit card companies 22, one or more ecommerce platforms 14 and/or one or more corporations 12. Networks may include, for example, a private network or a public network, such as the Internet or networks may comprise a combination of public and/or private networks. In some examples, networks may comprise one or more of a wide area network (WAN) (e.g., the Internet), a local area network (LAN), a virtual private network (VPN), or another wired or wireless communication network.

According to the techniques described in this disclosure, each of processor bot unit 66A and 66B executed on bot platform 56 may be configured to connect and communicate with a separate one of credit card processors 20 or credit card companies 22 from FIG. 2. For example, processor bot unit 66A may be configured to connect and communicate with credit card processor 20A of FIG. 2 and processor bot unit 66B may be configured to connect and communicate with credit card processor 20B of FIG. 2. In other examples, bot platform 56 may include more than two processor bot units associated with other credit card processors or credit card companies. The connections between the processor bot units 66 and the credit card processors 20 may include a secure API or other secure protocol to allow for the transfer of order status and other order related information.

In the example of FIG. 3, processor bot unit 66A comprises one or more bots including e.g., authenticate bot 44A, capture bot 46A, settle bot 48A, disburse bot 50A, fees bot 52A, and chargeback bot 54A. Similarly, processor bot unit 66B comprises one or more bots including e.g., authenticate bot 44B, capture bot 46B, settle bot 48B, disburse bot 50B, fees bot 52B, and chargeback bot 54B. Each of the bots within processor bot units 66 may operate substantially similar to authenticate bot 44, capture bot 46, settle bot 48, disburse bot 50, fees bot 52, and chargeback bot 54 of FIG. 2. In addition, the bots within processor bot units 66 may be static or permeant software applications executed on bot platform 56. In some examples, each of processor bot unit 66 may comprise a virtual machine or virtual software instance.

Order bot unit 68 is configured to receive instructions to create a new order bot 42A-42N based on a new transaction from, e.g., an ecommerce platform 14. In other examples, order bot unit 68 creates a new order bot 42 when order bot unit 68 receives information regarding an order that currently is not being tracked by another order bot. In some examples, a new order bot 42 is created for each order placed on ecommerce platform 14. In other examples, a new order bot 42 is created for only certain orders based on e.g., the monetary value of the transaction or due to problems that have occurred in the transaction previously. Order unit 68 may contain a large number of concurrent order bots 42 each concurrently processing information to determine the status of an individual order or transaction, and requesting status information from the bots within one or processor bot units 66.

As an example, after creation, order bot 42A may determine which of processor bot units 66 to query. Such a determination may be based on information received at creation of order bot 42A including, for example, information regarding which type of credit card (e.g., issued by credit card company 22A, 22B, or 22C) was used for the transaction or which of credit card processors 20 was used. After determining which of processor bot units 66 to query (e.g., processor bot unit 66A), order bot 42A may query one or more of the bots included in processor bot unit 66A (e.g., authenticate bot 44A, capture bot 46A, settle bot 48A, disburse bot 50A, fees bot 52A, and chargeback bot 54A) to request status information of the order using, e.g., an order number. In return, each of the one or more bots may submit queries to the one of credit card processors 20 or credit card companies 22, via communication units 62, and/or look up status information in a log of previously collected status information from payment processors 20 or credit card companies 22. In some examples, order bot 42A may respond to queries from ecommerce platform 14 or corporation 12 regarding the status of one or more orders. In other examples, order bot 42 may provide updates to ecommerce platform 14 or corporation 12 as the status of the order changes or when errors occur. Order bot 42 and/or order unit 68 may be configured to determine which orders will be disbursing funds in the next day, the next two days, and/or the next week and an amount of money that will be disbursed after fees and chargebacks.

For example, settle bot 48 may query a settle task 30 of credit card processor 20 and determine a transaction has settled. Once flagged as settled by settle bot 48, disburse bot 50 may query disburse task 32 of credit card processor 20 to retrieve the actual timing of the disbursement. In another example, disburse bot 50 may predict the timing of the disbursement based on a historical analysis of previous transaction and disbursement data. Disburse bot 50 may access transaction and/or disbursement logs in memory 64 and predict based on the historical data. The prediction may be based on a subset of data from the particular credit card processor 20 or the particular credit card company 22 or a combination of credit card processor 20 and the credit card company 22. Prediction may also be based on a subset of data from the time of the year, the time of the month, or day of the week of the completion of settlement or disbursement of the transaction. The transaction and disbursement data may include timing data between the completion of settlement and disbursement. Statistical analysis may be applied to this timing data or subset of the timing data. For example, the time between settlement and disbursement may be averaged to form the prediction. In other examples, the prediction may use other statistical techniques such as time series analysis to make a prediction of the disbursement date of a transaction. These analytical techniques may also be performed a single time or periodically and resulting prediction timing data stored in a look up table to speed up the prediction processing for a larger number of transactions.

Order bot 42 and/or order unit 68 may be configured to provide a breakdown of which orders are involved in a particular disbursement. Order bot 42 may store status information in a log for each order received from authenticate bot 44, capture bot 46, settle bot 48, disburse bot 50, fees bot 52, and chargeback bot 54. The log may be stored in memory 64. Order unit 68 or processors 60 may generate reconciliation reports for the corporation that includes disbursements for the next day, the next two days, and/or the next week broken down by order/transaction. The reconciliation reports may include status of the order, disbursement information, fees information, and/or chargeback information. Reconciliation reports may be generated by order unit 68 or processors 60 for virtually any period of time including one day, one week, one month, and one year. These reports may be configured to be readable by one or more spreadsheet or accounting software products or for display on a user device.

In some examples, each of order bots 42 may comprise a virtual machine or virtual software instance that is instantiated and maintained during the period of time that the associated transaction is active. In some examples of the disclosed techniques, order bots 42 may be deleted or removed from bot platform 56 when the order or transaction is no longer active, i.e., the funds have been disbursed. In other examples, order bot 42 may be deleted or removed from bot platform 56 at the completion of the applicable chargeback period for the particular transaction. In some examples, the applicable chargeback period is specific to the associated one of credit card companies 22 or credit card processors 20.

Figure 4:
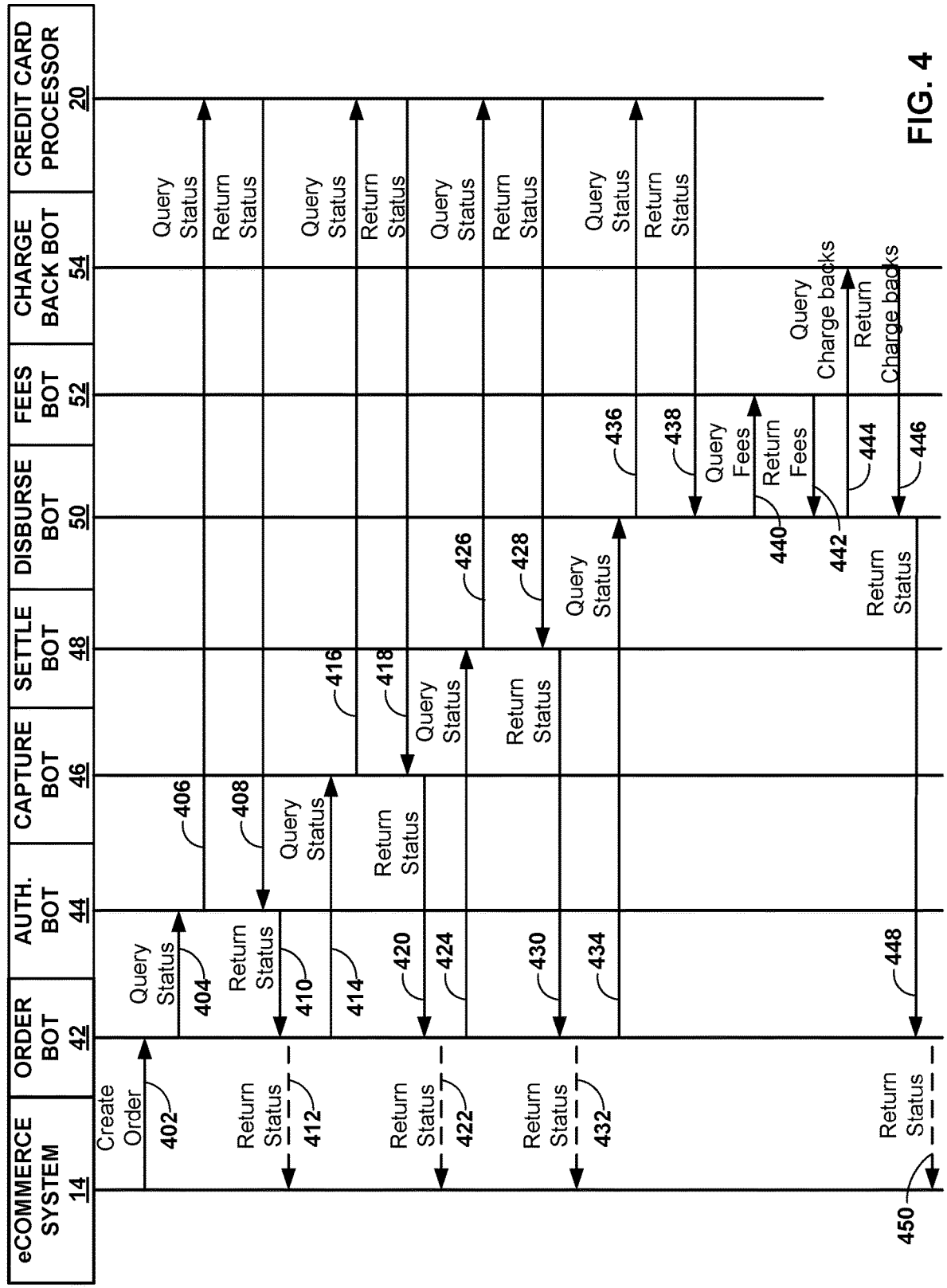
FIG. 4 illustrates a call flow describing a use case of the cash reconciliation bots system, in accordance with the techniques of this disclosure.

FIG. 4 illustrates a call flow describing a use case of the cash reconciliation bots system, in accordance with the techniques of this disclosure. The example operation of FIG. 4 is described with respect to the ecommerce platform 14 of FIG. 2 which connects to the bot platform 56 of FIGS. 2 and 3 which in turn connects to the credit card processors 20 of FIG. 2. Bot platform 56 may connect to credit card processors 20 via a secured API connection. In some examples, the secured API connection is encrypted. In some examples, the secured API includes a Representational state transfer (REST) API. In other examples, as described above, instead of credit card processors 20, bot platform 56 may connect to credit card companies 22 to obtain status information.

According to an example operation, customer 34 places an order for widgets from corporation 12 via ecommerce platform 14. Ecommerce platform 14 may route the transaction to payment gateway 18 to access the credit card system. Ecommerce platform 14 may also use bot platform 56 to track the status of the credit card transaction and determine when the funds from the transaction are going to be disbursed into bank 16 of corporation 12.

When an order is created on ecommerce platform, ecommerce platform 14 sends a message (402) to bot platform 56 to create a new order bot 42 and associate the new order bot 42 with a particular order number. The order number may also be associated with a credit card processor 20 which may be based on the type of credit card used by customer 34. The association with a credit card processor allows order bot 42 to determine which set of authenticate bot 44, capture bot 46, settle bot 48, disburse bot 50, fees bot 52, and chargeback bot 54 to select.

Once instantiated, order bot 42 may query authenticate bot 44 for the authentication status of the order (404). Authenticate bot 44 may query credit card processor 20 for status information (406). The query for status information may be in response to the request from order bot 42. Credit card processor 20 may return the authentication status to authenticate bot 44 (408), which may return the status to order bot 42 (410). In some examples, order bot 42 will return the authentication status to ecommerce platform 14 (412). In other examples, order bot 42 may store the status in a log associated with the order or transaction. Where the authentication status remains pending, order bot 42 and/or authenticate bot 44 may re-query for the status information until a final status (e.g., authenticated or denied authentication) is returned from credit card processor 20.

Order bot 42 may next query capture bot 46 for the capture status of the order (414). Capture bot 46 may query credit card processor 20 for status information (416). The query for status information may be in response to the request from order bot 42. Credit card processor 20 may return the capture status to capture bot 46 (418), which may return the status to order bot 42 (420). In some examples, order bot 42 will return the capture status to ecommerce platform 14 (422). In other examples, order bot 42 may store the status in a log associated with the order or transaction. Where the capture status remains pending, order bot 42 and/or capture bot 46 may re-query for the status information until a final status is returned from credit card processor 20.

Order bot 42 may query settle bot 48 for the settlement status of the order (424). Settle bot 48 may query credit card processor 20 for status information (426). The query for status information may be in response to the request from order bot 42. Credit card processor 20 may return the settlement status to settle bot 48 (428), which may return the status to order bot 42 (430). In some examples, order bot 42 will return the settlement status to ecommerce platform 14 (432). In other examples, order bot 42 may store the status in a log associated with the order or transaction. Where the capture status remains pending, order bot 42 and/or settle bot 48 may re-query for the status information until a final status is returned from credit card processor 20.

Order bot 42 may query disburse bot 50 for the settlement status of the order (434). Disburse bot 50 may query credit card processor 20 for status information (436). The query for status information may be in response to the request from order bot 42. Credit card processor 20 may return the disbursement status to disburse bot 50 (438). Disburse bot 50 may query fees bot 52 (440) and chargeback bot 54 (446) for information related to fees and chargebacks regarding the order. Fees bot 52 may return fees related information to disburse bot 50 (442). Chargeback bot 54 may return chargeback related information to disburse bot 50 (446). Disburse bot 50 may return the status to order bot 42 (448) including chargeback and fee information/status. Order bot 42 may return the settlement status to ecommerce platform 14 (450). In other examples, order bot 42 may store the status in a log associated with the order or transaction. Where the disbursement status remains pending, order bot 42 and/or disburse bot 50 may re-query for the status information until a final status is returned from credit card processor 20.

Order bot 42 may log some or all the status information retrieved from authenticate bot 44, capture bot 46, settle bot 48, disburse bot 50, fees bot 52, and/or chargeback bot 54. Order bot 42 may remain active until the end of the chargeback period of the order at which point order bot 42 may be removed from bot platform 56. Bot platform 56 may be configured to compile all the status information from order bots 42 associated with a plurality of orders.

Figure 5:
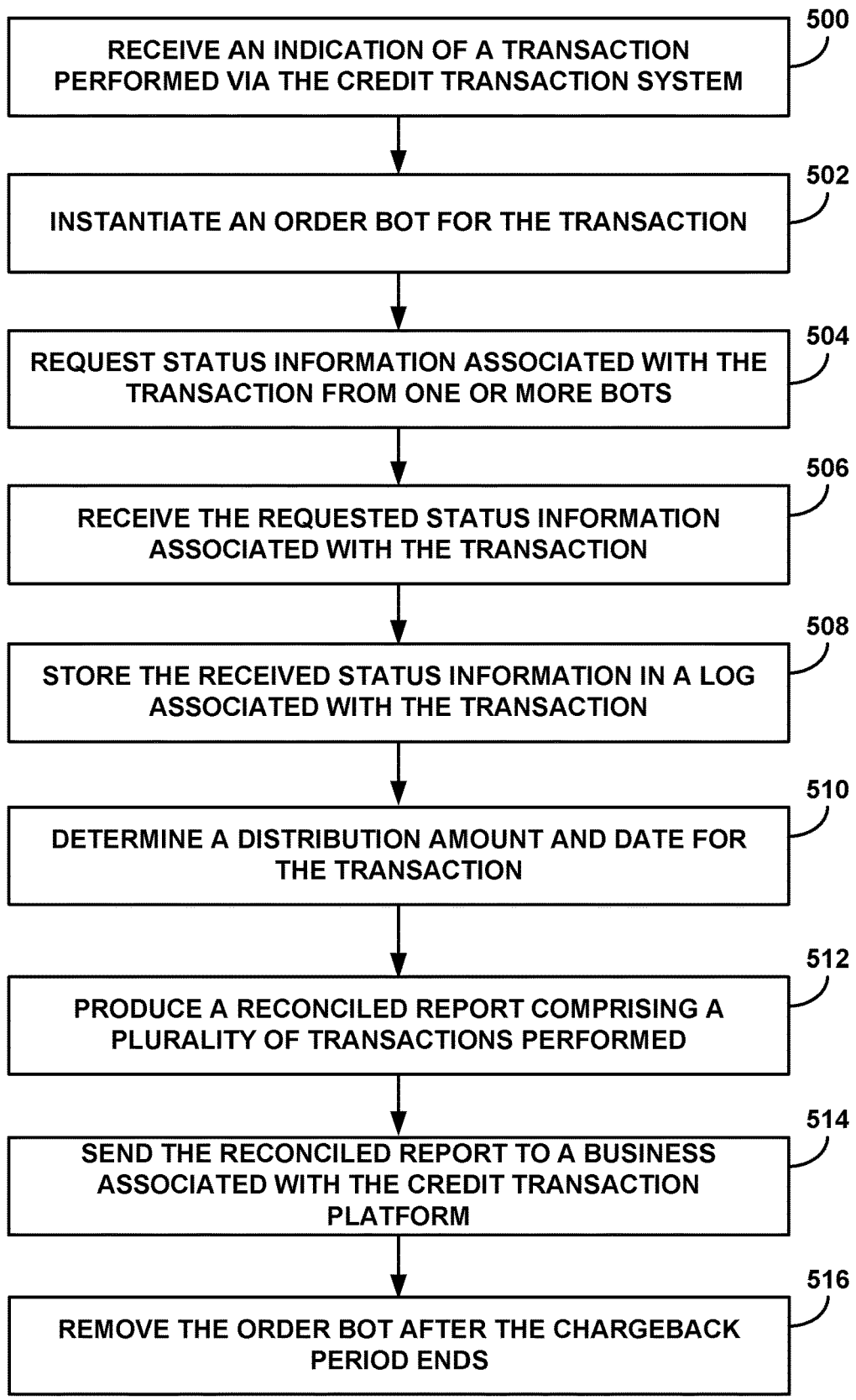
FIG. 5 is a flowchart illustrating an example operation of the cash reconciliation bots system, in accordance with the techniques of this disclosure

FIG. 5 is a flowchart illustrating an example operation of the cash reconciliation bots system, in accordance with the techniques of this disclosure. The example operation of FIG. 5 is described with respect to bot platform 56 in communication with eCommerce platform 14 and credit card processors 20 and/or credit card companies 22 of FIG. 2 via, e.g., a secure application programming interface (API).

Bot platform 56 may be configured receive an indication of a transaction performed via the credit transaction system (500). The transaction may have been placed on ecommerce platform 14. In one example, the transaction includes a new order. Bot platform 56 may be configured to in response to receiving the transaction indication, instantiate an order bot 42 for the transaction (502).

Order bot 42 may also be configured to request status information associated with the transaction from one or more bots (504). The bots may be configured to query the status information associated with the transaction from a credit card processor 20 or credit card company 22 used by the credit transaction system. In some examples, order bot 42 is configured to query one or more bots configured to query status information associated with the transaction from credit card company 22. The one or more bots may include: authenticate bot 44 configured to query and retrieve authentication status information from credit card processor 20, authentication status information comprising a status of a determination of whether credit card credentials associated with the transaction is valid and whether sufficient funds are available to complete the transaction; capture bot 46 configured to query and retrieve capture status information from the credit card processor 20, capture status information comprising a status of a determination whether funds have been held by credit card processor 20; settle bot 48 configured to query and retrieve settlement status information from credit card processor 20, settlement status information comprising a status of a determination of whether funds have been transferred to credit card processor 20; and disburse bot 50 configured to query and retrieve disbursement status information from credit card processor 20, disbursement status information comprising a status of a determination of whether net proceeds of the transaction have been transferred from the credit card to a merchant of the transaction. Disburse bot 50 may be configured to query fees bot 52 configured to determine fees associated with a disbursement associated with the order and/or chargeback bot 54 configured to determine chargebacks associated with the disbursement. The status may include, for example, "authentication pending," "settlement pending," "order cancelled," "order completed," or "order failed/declined." Status information and other data about an order may be stored in memory by order bot 42. In some examples, the bots may be configured to communicate with credit card processor 20 or credit card company 22 via a secure application programming interface (API).

Order bot 42 may be configured to receive the requested status information associated with the transaction (506). Order bot 42 may be configured to store the received status information in a log associated with the transaction (508). The log may be stored in memory.

Order bot 42 may be configured to determine a distribution amount and date for the transaction (510). Order bot 42 may be configured to, based on the received status information, determine a date in a future time period on which funds for the transaction will be disbursed to a bank account of a business associated with the credit transaction platform. In some examples that future time period may include the next day or the next week. In some examples, order bot 42 may be configured to determine a disbursement amount associated with the order that will be disbursed at the future time. Order both 42 may determine the determine an amount of the funds for the transaction, net of fees and charge backs, that will be disbursed to the bank account of the business on the determined date. Order bot 42 may be configured to communicate the determined distribution amount and date for the transaction to a business associated with the credit transaction platform. In some examples, order bot 42 may be configured to produce a reconciled report comprising a plurality of transactions performed via the credit transaction system (512). The reconciled report may include an order number associated with the order and the disbursement amount and date. Order bot 42 may be configured to send the reconciled report send the reconciled report to a business associated (e.g., corporation 12) with the credit transaction platform (514). Order bot 42 may be configured to determine a chargeback period for the order. The chargeback period may be based on the type of credit card used and the credit card network used to make the purchase. Bot platform 56 may be configured to remove the order bot after the chargeback period ends (516).

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over a computer-readable medium as one or more instructions or code, and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry, as well as any combination of such components. Accordingly, the term "processor," as used herein may refer to any of the foregoing structures or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless communication device or wireless handset, a mobile computing device, a wearable computing device, a microprocessor, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples have been described. These and other examples are within the scope of the following claims.

What is claimed is:

1. A computing device comprising:
a memory; and
one or more processors in communication with the memory and configured to:
receive, from a credit transaction system, an indication of a transaction performed via the credit transaction system including identification of a first credit card processor of a plurality of credit card processors as processing the transaction;
in response to receiving the indication of the transaction, create an instance of an order bot specifically associated with the transaction, the order bot configured to send one or more status information requests associated with the transaction to each bot within a first set of bots executing on the computing device, wherein each bot within the first set of bots is in communication with a respective transaction stage of multiple different transaction stages executing on one or more servers of the first credit card processor;
wherein, in response to the one or more status information requests from the order bot, each bot within the first set of bots is configured to query the respective transaction stage executing on the one or more servers of the first credit card processor for status information associated with the transaction;
wherein the order bot is further configured to:
receive the status information associated with the transaction from each bot within the first set of bots;
based on the status information, determine a disbursement date in a future time period on which funds for the transaction will be disbursed to a bank account of a business associated with the credit transaction system; and
communicate, to the business associated with the credit transaction system, the disbursement date of the transaction to enable reconciliation of the transaction with an aggregate disbursement occurring on the disbursement date to the bank account of the business from one of the first credit card processor or a credit card company associated with the first credit card processor; and
in response to the transaction no longer being active, terminate the order bot.

2. The computing device of claim 1, wherein the first set of bots executed on the computing device comprises:
an authenticate bot configured to query and retrieve authentication status information from an authentication stage executed on the one or more servers of the first credit card processor, authentication status information comprising a status of a determination of whether credit card credentials associated with the transaction are valid and whether sufficient funds are available to complete the transaction;
a capture bot configured to query and retrieve capture status information from a capture stage executed on the one or more servers of the first credit card processor, capture status information comprising a status of a determination whether funds have been held by the first credit card processor;
a settle bot configured to query and retrieve settlement status information from a settlement stage executed on the one or more servers of the first credit card processor, settlement status information comprising a status of a determination of whether funds have been transferred to the first credit card processor; and a disburse bot configured to query and retrieve disbursement status information from a disbursal stage executed on the one or more servers of the first credit card processor, disbursement status information comprising a status of a determination of whether net proceeds of the transaction have been transferred from the first credit card processor or the credit card company associated with the first credit card processor to the business associated with the credit transaction system.

3. The computing device of claim 2, wherein the disburse bot is further configured to query at least one of:

a fees bot executed on the computing device configured to determine fees associated with the transaction; and a chargeback bot executed on the computing device configured to determine charge backs associated with the transaction.

4. The computing device of claim 1, wherein each bot within the first set of bots executed on the computing device is configured to communicate with the respective transaction stage executing on one or more servers of the first credit card processor via a secure application programming interface (API).

5. The computing device of claim 1, wherein the one or more processors are further configured to:

determine a charge back period for the transaction; and after the charge back period ends, determine that the transaction is no longer active.

6. The computing device of claim 1, wherein the order bot is further configured to, based on the status information, determine a disbursement amount of the funds for the transaction, net of fees and charge backs, that will be disbursed to the bank account of the business on the disbursement date.

7. The computing device of claim 1, wherein the one or more processors are further configured to, based on the status information:

generate a reconciliation report for the aggregate disbursement broken down by transaction for the future time period, the reconciliation report including an order number associated with the transaction, a disbursement amount of the funds for the transaction, and the disbursement date for the transaction; and send the reconciliation report to the business associated with the credit transaction system to enable the reconciliation of the transaction with the aggregate disbursement.

8. The computing device of claim 1, wherein the one or more processors are further configured to:

execute the first set of bots in communication with the one or more servers of the first credit card processor;

execute a second set of bots in communication with one or more servers of a second credit card processor of the plurality of credit card processors;

execute a plurality of order bots associated with a plurality of active transactions processed by the first credit card processor and the second credit card processor, wherein the order bot associated with the transaction comprises a first order bot associated with a first transaction processed by the first credit card processor, and wherein the first order bot is configured to send the one or more status information requests associated with the first transaction to the first set of bots that are in communication with the one or more servers of the first credit card processor;

receive, from the credit transaction system, an indication of a second transaction performed via the credit transaction system including identification of the second credit card processor as processing the second transaction;

in response to receiving the indication of the second transaction, create an instance of a second order bot specifically associated with the second transaction processed by the second credit card processor, wherein the second order bot is configured to send one or more status information requests associated with the second transaction to the second set of bots that are in communication with the one or more servers of the second credit card processor; and in response to the second transaction no longer being active, terminate the second order bot.

9. The computing device of claim 8, wherein, in response to the one or more status information requests from the second order bot, each bot within the second set of bots is configured to query a respective transaction stage executing on the one or more servers of the second credit card processor for status information associated with the second transaction; and wherein the second order bot is further configured to:

receive the status information associated with the second transaction from each bot within the second set of bots;

based on the status information, determine a second disbursement date in a second future time period on which funds for the second transaction will be disbursed to the bank account of the business associated with the credit transaction system; and communicate, to the business associated with the credit transaction system, the second disbursement date of the second transaction to enable reconciliation of the second transaction with a second aggregate disbursement occurring on the second disbursement date to the bank account of the business from one of the second credit card processor or a credit card company associated with the second credit card processor.

10. A method comprising:

receiving, by a computing device and from a credit transaction system, an indication of a transaction performed via the credit transaction system including identification of a first credit card processor of a plurality of credit card processors as processing the transaction;

in response to receiving the indication of the transaction, creating, by the computing device, an instance of an order bot specifically associated with the transaction;

sending, by the order bot on the computing device, one or more status information requests associated with the transaction to each bot within a first set of bots executing on the computing device, wherein each bot within the first set of bots is in communication with a respective transaction stage of multiple different transaction stages executing on one or more servers of the first credit card processor;

in response to the one or more status information requests from the order bot, querying, by each bot within the first set of bots on the computing device, the respective transaction stage executing on the one or more servers of the first credit card processor for status information associated with the transaction;

receiving, by the order bot on the computing device, the status information associated with the transaction from each bot within the first set of bots;

based on the status information, determining, by the order bot on the computing device, a disbursement date in a future time period on which funds for the transaction will be disbursed to a bank account of a business associated with the credit transaction system;

communicating, by the order bot on the computing device and to the business associated with the credit transaction system, the disbursement date of the transaction to enable reconciliation of the transaction with an aggregate disbursement occurring on the disbursement date to the bank account of the business from one of the first credit card processor or a credit card company associated with the first credit card processor; and in response to the transaction no longer active, terminating, by the computing device, the order bot.

11. The method of claim 10, wherein querying, by each bot within the first set of bots executed on the computing device, the respective transaction stage executing on the one or more servers of the first credit card processors further comprises:

querying for and retrieving, by an authenticate bot, authentication status information from an authentication stage executed on the one or more servers of the first credit card processor, authentication status information comprising a status of a determination of whether credit card credentials associated with the transaction are valid and whether sufficient funds are available to complete the transaction;

querying for and retrieving, by a capture bot, capture status information from a capture stage executed on the one or more servers of the first credit card processor, capture status information comprising a status of a determination whether funds have been held by the credit card processor;

querying for and retrieving, by a settle bot, settlement status information from a settlement stage executed on the one or more servers of the first credit card processor, settlement status information comprising a status of a determination of whether funds have been transferred to the credit card processor; and querying for and retrieving, by a disburse bot, disbursement status information from a disbursal stage executed on the one or more servers of the first credit card processor, disbursement status information comprising a status of a determination of whether net proceeds of the transaction have been transferred from the first credit card processor or the credit card company associated with the first credit card processor to the business associated with the credit transaction system.

12. The method of claim 11, further comprising querying, by the disburse bot at least one of:

a fees bot executed on the computing device configured to determine fees associated with the transaction; and a chargeback bot executed on the computing device configured to determine charge backs associated with the transaction.

13. The method of claim 10, wherein each bot within the first set of bots executed on the computing device is configured to communicate with the respective transaction stage executing on one or more servers of the first credit card processor via a secure application programming interface (API).

14. The method of claim 10, further comprising:
determining a charge back period for the transaction; and
after the charge back period ends, determining that the transaction is no longer active.

15. The method of claim 10, further comprising, based on the status information, determining a disbursement amount of the funds for the transaction, net of fees and charge backs, that will be disbursed to the bank account of the business on the disbursement date.

16. The method of claim 10, further comprising, based on the status information:

generate a reconciliation report for the aggregate disbursement broken down by transaction for the future time period, the reconciliation report including an order number associated with the transaction, a distribution amount of the funds for the transaction, and the disbursement date for the transaction; and sending the reconciliation report to the business associated with the credit transaction system to enable the reconciliation of the transaction with the aggregate disbursement.

17. The method of claim 10, further comprising:

executing, by the computing device, the first set of bots in communication with the one or more servers of the first credit card processor;

executing, by the computing device, a second set of bots in communication with one or more servers of a second credit card processor of the plurality of credit card processors;

executing, by the computing device, a plurality of order bots associated with a plurality of active transactions processed by the first credit card processor and the second credit card processor, wherein the order bot associated with the transaction comprises a first order bot associated with a first transaction processed by the first credit card processor, and wherein the first order bot is configured to send the one or more status information requests associated with the first transaction to the first set of bots that are in communication with the one or more servers of the first credit card processor;

receiving, by the computing device and from the credit transaction system, an indication of a second transaction performed via the credit transaction system including identification of the second credit card processor as processing the second transaction;

in response to receiving the indication of the second transaction, creating, by the computing device, an instance of a second order bot specifically associated with the second transaction processed by the second credit card processor;

sending, by the second order bot on the computing device, one or more status information requests associated with the second transaction to the second set of bots that are in communication with the one or more servers of the second credit card processor; and in response to the second transaction no longer being active, terminating, by the computing device, the second order bot.

18. The method of claim 17, further comprising:
in response to the one or more status information requests from the second order bot, querying, by each bot within the second set of bots on the computing device, a respective transaction stage executing on the one or more servers of the second credit card processor for status information associated with the second transaction;

receiving, by the second order bot on the computing device, the status information associated with the second transaction from each bot within the second set of bots;

based on the status information, determining, by the second order bot on the computing device, a second disbursement date in a second future time period on which funds for the second transaction will be disbursed to the bank account of the business associated with the credit transaction system; and communicating, by the second order bot on the computing device and to the business associated with the credit transaction system, the second disbursement date of the second transaction to enable reconciliation of the second transaction with a second aggregate disbursement occurring on the second disbursement date to the bank account of the business from one of the second credit card processor or a credit card company associated with the second credit card processor.

19. A non-transitory computer-readable medium having instructions stored thereon that, upon execution, cause one or more processors to:

receive, from a credit transaction system, an indication of a transaction performed via the credit transaction system including identification of a first credit card processor of a plurality of credit card processors as processing the transaction;

in response to receiving the indication of the transaction, create an instance of an order bot specifically associated with the transaction;

send, by the order bot, one or more status information requests associated with the transaction to each bot within a first set of bots executing on the computing device, wherein each bot within the first set of bots is in communication with a respective transaction stage of multiple different transaction stages executing on one or more servers of the first credit card processor;

in response to the one or more status information requests from the order bot, query, by each bot within the first set of bots, the respective transaction stage executing on the one or more servers of the first credit card processor for status information associated with the transaction;

receive, by the order bot, the status information associated with the transaction from each bot within the first set of bots;

based on the status information, determine, by the order bot, a disbursement date in a future time period on which funds for the transaction will be disbursed to a bank account of a business associated with the credit transaction system;

communicate, by the order bot and to the business associated with the credit transaction system, the disbursement date of the transaction to enable reconciliation of the transaction with an aggregate disbursement occurring on the disbursement date to the bank account of the business from one of the first credit card processor or a credit card company associated with the first credit card processor; and in response to the transaction no longer being active, terminate the order bot.

20. The non-transitory computer-readable medium of claim 19, wherein the instruction that cause the one or more processors to query, by each bot within the first set of bots, the respective transaction stage executing on the one or more servers of the first credit card processors further comprise instructions that cause the one or more processors to:

query for and retrieve, by an authenticate bot, authentication status information from an authentication stage executed on the one or more servers of the first credit card processor, authentication status information comprising a status of a determination of whether credit card credentials associated with the transaction are valid and whether sufficient funds are available to complete the transaction;

query for and retrieve, by a capture bot, capture status information from a capture stage executed on the one or more servers of the first credit card processor, capture status information comprising a status of a determination whether funds have been held by the credit card processor;

query for and retrieve, by a settle bot, settlement status information from a settlement stage executed on the one or more servers of the first credit card processor, settlement status information comprising a status of a determination of whether funds have been transferred to the credit card processor; and query for and retrieve, by a disburse bot, disbursement status information from a disbursal stage executed on the one or more servers of the first credit card processor, disbursement status information comprising a status of a determination of whether net proceeds of the transaction have been transferred from the credit card to a business associated with the transaction.

* * * * *